United States Patent [19]
Meattle

[11] Patent Number: 5,401,546
[45] Date of Patent: Mar. 28, 1995

[54] POUCH FOR STORAGE AND DISPENSING OF LUBRICATING OIL

[76] Inventor: Kamal Meattle, 25 Community Centre, East of Kailash, New Delhi, India, 110065

[21] Appl. No.: 169,543

[22] Filed: Dec. 20, 1993

Related U.S. Application Data

[63] Continuation of Ser. No. 704,932, May 23, 1991, abandoned.

[51] Int. Cl.[6] ............................................. B29D 22/00
[52] U.S. Cl. .................................. 428/35.2; 428/483; 428/515; 428/517; 428/523; 206/524.2; 206/484; 383/113; 383/116
[58] Field of Search ................. 428/35.2, 34.9, 483, 428/515, 517, 523; 206/524.2, 484, 497; 383/109, 113, 116

[56] References Cited

U.S. PATENT DOCUMENTS

| | | | |
|---|---|---|---|
| 4,491,598 | 1/1985 | Hsu et al. | 426/127 |
| 4,643,926 | 2/1987 | Mueller | 428/35 |
| 4,687,688 | 8/1987 | Curie et al. | 428/35 |
| 4,705,707 | 11/1987 | Winter | 428/35 |
| 4,720,425 | 1/1988 | Hattori et al. | 428/483 |
| 4,891,253 | 2/1990 | Mueller et al. | 428/35.2 |
| 4,902,543 | 2/1990 | Ernst | 428/35.2 |
| 4,935,271 | 6/1990 | Schirmer | 428/35.2 |

Primary Examiner—Charles R. Nold
Attorney, Agent, or Firm—Kerkam, Stowell, Kondracki & Clarke

[57] ABSTRACT

The present invention relates to a pouch for storage and dispensing of lubricating oil and comprises a back sheet heat sealed along the vertical ends to a front sheet, a base sheet heat sealed to said back and front sheets. Each of said sheets comprises a laminate of a polyester sheet adhered to a coextruded sheet comprising layers selected from high density polyethylene, low density polyethylene and linear low density polyethylene.

8 Claims, 1 Drawing Sheet

5,401,546

POUCH FOR STORAGE AND DISPENSING OF LUBRICATING OIL

This application is a continuation of application Ser. No. 07/704,932, filed May 23, 1991, abandoned.

FIELD OF INVENTION

This invention relates to a pouch for storage and dispensing of oil such as grease and lubricating oil, Though reference is made to lubricating oil as tile liquid and to which the pouch has an advantageous application such a reference is only by way of an exemplary embodiment and without implying any limitation on the scope of the invention.

PRIOR ART

Lubricating oil are presently stored in plastic or aluminium containers closed by a metallic diaphragm at the mouth of said container, Holes are punched in the metallic diaphragm for allowing a discharge of the oil. A disadvantage of such a container is that of transportation to the oil filling location as the container occupies a substantial volume and, consequentially, the transportation costs contribute to the end costs of the product. Yet a further disadvantage is of the disposal of the used containers.

OBJECTS OF THE INVENTION

A primary object of the invention is to propose a pouch for storage and dispensing of grease and lubricating oil.

Yet another object of this invention is to propose a pouch for storage and dispensing of lubricating oil which is substantially cheaper in costs than the known containers.

SCOPE OF THE INVENTION

According to this invention there is provided a pouch for storage of oil such as grease or lubricating oil comprising:
i) a front sheet,
ii) a back sheet,
iii) a bottom or base sheet,
iv) said front sheet securedly held in a heat sealed relationship to the back sheet along the vertical sides,
v) said base sheet securedly held in a heat sealed relationship to the front and back sheet,
vi) the upper end of the pouch adapted to be heat sealed when the oil is disposed therein,
vii) the front, back and base sheets comprising a polyester sheet adhered to a coextruded sheet,
viii) said coextruded sheet consisting of layers selected from low density polyethylene, linear low density polyethylene and high density polyethylene.

In accordance with this invention the pouch comprises a front sheet securedly held in a heat sealed relationship to a back sheet along the vertical sides. The pouch further has a base sheet securedly held in a heat sealed relationship to the front and back sheets in a sealing zone. Further, and when the oil is filled within the pouch, the upper side of the pouch is heat sealed. An oblique tear zone is provided with said pouch which, upon tearing, allows a discharge of the oil.

Such features of a pouch are known in the art and do not form a concept of the present invention. However, it was hitherto not known to provide a pouch for storage and dispensing of lubricating oil. Specifically, the pouch of the present invention has an advantageous application for storage of lubricating oil, which is now possible by the coextruded layers forming the back and front sheets of the pouch. The front and back sheets of the pouch each comprises a polyester sheet adhered, to a coextruded sheet selected from layers of low density polyethylene, linear low density polyethylene and high density polyethylene.

Preferably, the front and back sheets of the pouch comprises a three layer coextruded film or sheet of low density polyethylene, linear low density and high density polyethylene. However, the back and front sheet can consist of only two coextruded layers and, wherein, one of the layers is high density polyethylene.

In accordance with a preferred embodiment of this invention, the front sheet comprises a metallised polyester sheet adhered to a three layer coextruded film or sheet and, wherein, the metallised polyester sheet being the outer sheet. The innermost or contact layer is high density polyethylene.

The back sheet in accordance with a preferred embodiment also comprises an outer polyester sheet adhered to a three layer coextruded film or sheet and, wherein, the outer layer is the polyester layer. The innermost or contact layer is high density polyethylene.

Any suitable adhesive may be used such as polyurethene two component adhesive for adhering the polyester layer to the coextruded layers.

The base or bottom layer also comprises a three layer coextruded film or sheet selected from low density polyethylene, linear low density polyethylene and high density polyethylene, the latter being the innermost or contact layer.

DESCRIPTION OF INVENTION WITH REFERENCE TO ACCOMPANYING DRAWINGS

Figure 1:
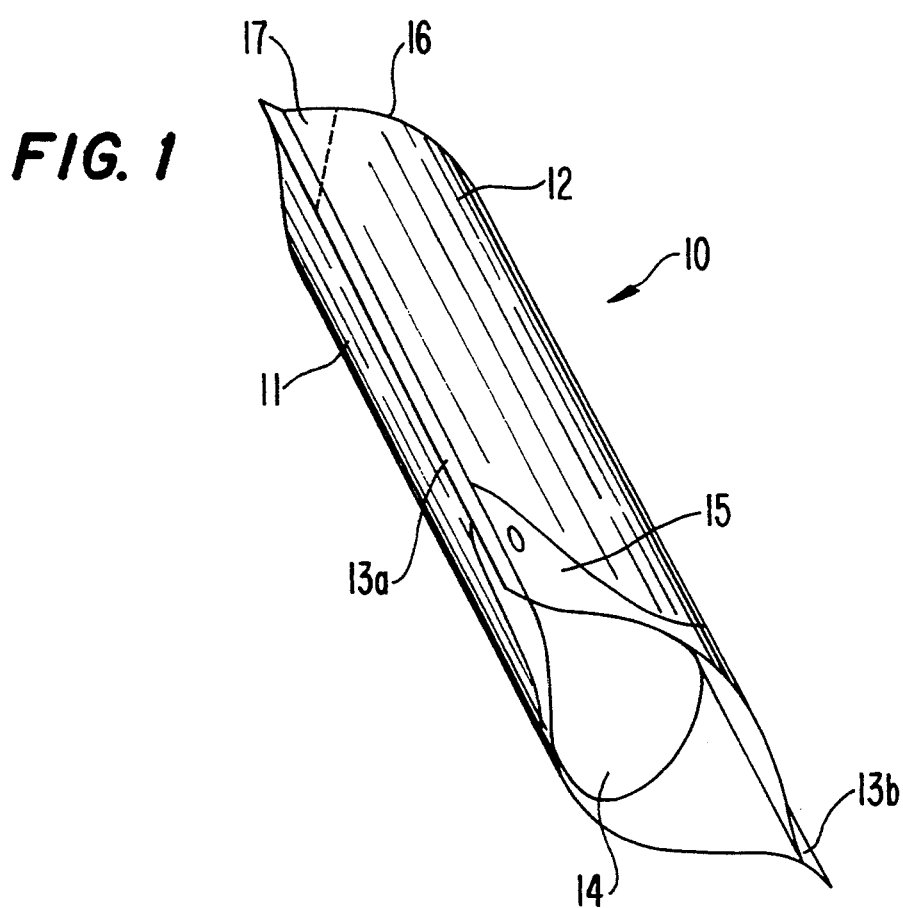
FIG. 1 shows the pouch of the present invention.

Referring to the drawings and with particular reference to FIG. 1 the pouch 10 of the present invention comprises a back sheet 11 and a front sheet 12. The back sheet 11 is heat sealed to the front sheet 12 along the longitudinal sides 13A and 13B.

The pouch 10 further comprises a base sheet 14 adapted to be held in a heat slidable relationship to the backsheet 11 and the front sheet 12 along heat sealed zone 15.

The upper end 16 of pouch 10 is also held in a heat sealed relationship when oil is disposed within the pouch. An oblique tear zone 17 is provided with pouch 10 which when torn forms an opening for discharge of oil from pouch 10.

Such features of a pouch are known in the art and do not form a concept of the present invention. However, and as described hereinabove, it was not hitherto known to have a pouch for storage and dispensing of lubricating oil. The pouch 10 of the present invention has a particular and advantageous application for storage and dispensing of grease or lubricating oil.

Figure 2A:
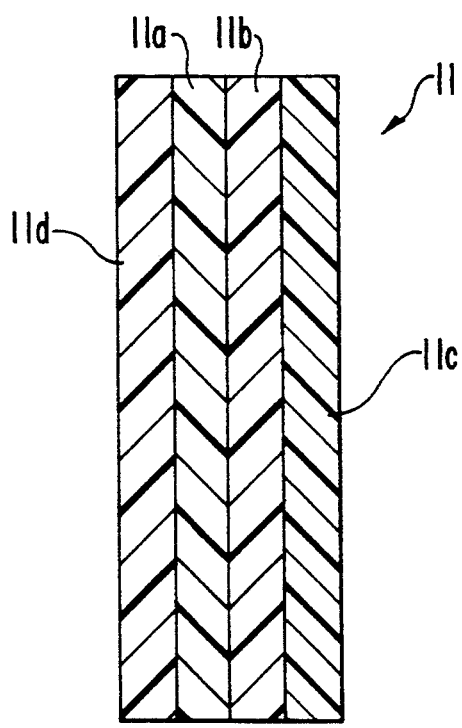
FIG. 2A shows sectional view on an enlarged scale of the front sheet.

Specifically, in accordance with the present invention and with reference to FIG. 2A, the back sheet 11 of the pouch is formed of coextruded layers selected from high density polyethylene, low density polyethylene and linear low density polyethylene. The coextruded film can consist of two or three layers.

The preferred embodiment of the back sheet illustrated in FIG. 2A shows a sheet or film of polyester sheet 11d adhered to said coextruded layers and, wherein, the polyester sheet forms the outer sheet.

In accordance with one embodiment of this invention, the coextruded film comprises an inner or contact layer of linear low density polyethylene with the outer layer 11d being polyester and the low density polyethylene layer and high density polyethylene layer being sandwich layers between said polyester sheet and the inner contact layer. Low density polyethylene and high density polyethylene may be provided in any arrangement with respect to each other.

In accordance with a preferred embodiment of this invention and as shown in FIG. 2A, the coextruded film comprises an inner or contact layer 11c of high density polyethylene with the outer layer 11d being polyester and low density polyethylene 11a and linear low density polyethylene 11b being the sandwich layers provided therebetween in any arrangement.

Figure 2B:
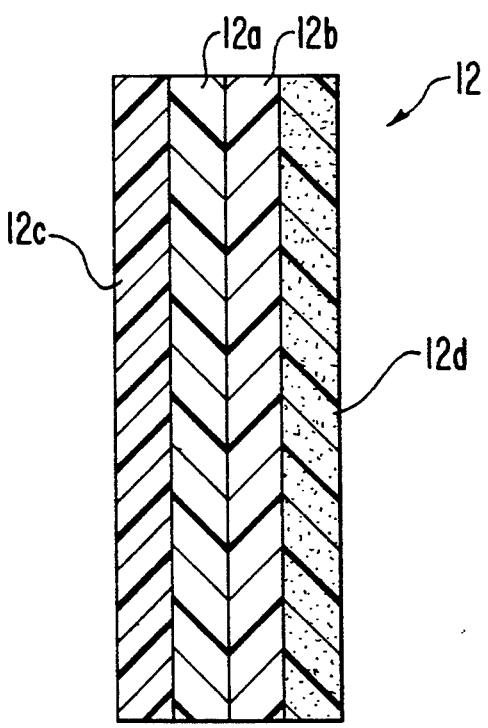
FIG. 2B shows a sectional view on an enlarged scale of the back sheet.

Reference is now made to the front sheet 12 as shown in FIG. 2B. The front sheet 12 also comprises a coextruded film selected from high density polyethylene, low density polyethylene and linear low density polyethylene.

The coextruded layers can consist of two or three layers as in the instance of back sheet 11.

FIG. 2B shows a preferred embodiment of three layers consisting of high density polyethylene layer 12c, low density polyethylene layer 12a and linear low density polyethylene layer 12b with an outer layer of metallised polyester 12d adhered to the coextruded layers.

In accordance with one embodiment, the inner or contact layer is linear low density polyethylene 12b and in which instance the inner or contact layer of the back sheet would also be linear low density polyethylene layer 11a.

In accordance with another embodiment, the inner or contact layer or front sheet 12 is high density polyethylene layer 12c and in which instance the inner or contact layer of back sheet 11 is also high density polyethylene layer 11c.

The base sheet consists of a coextruded film or sheet of two or three layers selected from low density polyethylene, linear low density polyethylene and high density polyethylene with a polyester sheet adhered thereto. The base of bottom sheet 14 has a construction similar to that of back sheet 11.

In the instance where the contact layer is of high density polyethylene, the polyester layer should preferably have a minimum thickness of 12 microns, the low density polyethylene and linear density polyethylene layers should have a minimum thickness of 72 microns and the high density polyethylene layer should have a minimum thickness of 36 microns.

In the instance where linear low density polyethylene is the contact layer, then the polyester layer should have a minimum thickness of 12 microns, the linear low density polyethylene and low density polyethylene should have a thickness each of 47 microns and the high density polyethylene should have a minimum thickness of 50 microns.

A typical 20 ml lubricating pouch of the present invention has the following properties:

Front sheet consisting of silver metallised polyester adhered to coextruded layers of low density polyethylene, linear low density polyethylene and high density polyethylene and where high density polyethylene is the contact layer and the polyester layer is the outer layer.

The back sheet consists of polyester adhered to coextruded layers of low density polyethylene, linear low density polyethylene and high density polyethylene and which was pigmented white in the central layer and, wherein, the high density polyethylene is the inner or contact layer and the polyester sheet is the outer sheet.

The base of bottom sheet consists of an outer sheet of polyester adhered to the coextruded layers of low density polyethylene, linear low density polyethylene and high density polyethylene.

The polyester layer has a thickness of 12 microns, linear low density polyethylene and low density polyethylene 72 microns, high density polyethylene 36 microns.

The seal strength at the manufacturing stage (ASTM F 88-85) are as follows:

| Side Seals | Bottom Seals | Top Seal |
| --- | --- | --- |
| 4.5 Kgs/15 linear mm (min) For the following seals a) Right of front b) Left of Front | 4.0 Kgs/15 linear mm (min) For the following Seals a) Right of front b) Left of front c) Centre of front d) Right of back e) Left of back f) Centre of back | 3.5 Kgs/15 linear mm (min) |

The peel strength at the manufacturing stage (ASTM F-904-84) is as follows:

| Length wise | Width wise |
| --- | --- |
| 350 Gms/15 linear mm (min) a) Between Met Pet & Poly. b) Between Pet & Poly | 350 Gms/15 linear mm (min) a) Between Met Pet & Poly. b) Between Pet & Poly. |

The dead weight bearing capacity is 125 kilos.

The oxygen transmission rate of laminate is as follows:

a) 50 cc/m2/24 hours at $27+/-1$ deg C & $65+/-22$ RH for metallised area (max).

b) 75 dc/m2/24 hours at $27+/-1$ deg C & $65+/-22$ RH for metallised area (max).

The water vapour transmission rate of laminate is as follows:

a) 2.0 gms/m$^2$/24 hours at $38+/-1$ deg C & $90+/-22$ RH metallised area (max).

b) 2.2 gms/m$^2$/24 hours at $38+/-1$ deg C & $90+/-22$ RH metallised area (max).

The baloon bursting test was 1.9 kilos/CM$^2$ (min).

We claim:

1. An oil storage pouch comprising:
   i) a front sheet,
   ii) a back sheet,
   ii ) a bottom or base sheet,
   iv) said front sheet securely held in a heat sealed relationship to the back sheet along the longitudinal edges thereof,
   v) said base or bottom sheet securely held in a heat sealed relationship to the front and back sheets, vi) the end of the pouch opposite said base or bottom sheet adapted to be heat sealed when the oil is disposed therein, vii) the front, back and base sheets each comprising a polyester sheet adhered to a coextruded sheet, said polyester sheets of each of the front, back and base sheets being the outer layers of the pouch;

viii) said coextruded sheet consisting of at least two layers selected from low density polyethylene, linear low density polyethylene and high density polyethylene, each of the layers of the coextruded sheet being of a different material than each of the other layers of said coextruded sheet and wherein an inner layer of said coextruded sheet exposed at the inside of said pouch is high density polyethylene.

2. A pouch as claimed in claim 1 wherein the coextruded sheet comprises two layers, a first layer being said inner layer of high density polyethylene, and a second layer being selected from low density polyethylene and linear low density polyethylene.

3. A pouch as claimed in claim 1 wherein the coextruded sheet comprises three layers, a first layer being said inner layer of high density polyethylene, and a second and third layers, said second and third layers being selected from low density polyethylene and linear low density polyethylene.

4. A pouch as claimed in claim 1 wherein the polyester sheet has a minimum thickness of 12 microns.

5. A pouch as claimed in claim 3 wherein the low density polyethylene and linear low density polyethylene has a minimum thickness of 72 microns.

6. A pouch as claimed in claim 3 wherein the high density polyethylene layer has a minimum thickness of 50 microns and the low density polyethylene and linear low density polyethylene has a minimum thickness as 47 microns.

7. A pouch as claimed in claim 1 wherein high density polyethylene has a minimum thickness of 36 microns.

8. An oil storage pouch comprising:
i) a front sheet;
ii) a back sheet;
iii) a bottom or base sheet;
iv) said front sheet securely held in a heat sealed relationship to the back sheet along the vertical sides;
v) said base sheet securely held in a heat sealed relationship to the front and back sheet,
vi) the upper end of the pouch adapted to be heat sealed when oil is disposed therein,
vii) the front, back, and base sheets each comprising a polyester sheet adhered to a coextruded sheet, said polyester sheets of each of the front, back, and base sheets forming the outer exposed layers of the pouch;
viii) said coextruded sheet consisting of three layers, a first layer forming an inner layer exposed at the inside of the pouch being made of high density polyethylene, and second and third layers disposed between said inner contact layer and said outer polyester sheet, one of said second and third layers being made of low density polyethylene and the other of said second and third layers being made of linear low density polyethylene.

* * * * *